United States Patent [19]

Job

[11] Patent Number: 4,870,039
[45] Date of Patent: Sep. 26, 1989

[54] OLEFIN POLYMERIZATION CATALYSTS FROM SOLUBLE MAGNESIUM ALKOXIDES MADE FROM MIXED MAGNESIUM ALKYLS AND ARYLS

[75] Inventor: Robert C. Job, Houston, Tex.

[73] Assignee: Shell Oil Company, Houston, Tex.

[21] Appl. No.: 217,575

[22] Filed: Jul. 11, 1988

Related U.S. Application Data

[63] Continuation-in-part of Ser. No. 124,643, Nov. 24, 1987, abandoned.

[51] Int. Cl.$^4$ ................................................. C08F 4/64
[52] U.S. Cl. ..................................... 502/104; 502/125; 502/127; 502/128; 502/134
[58] Field of Search ............... 502/104, 125, 127, 128, 502/134

[56] References Cited

U.S. PATENT DOCUMENTS

| | | | |
|---|---|---|---|
| 3,135,809 | 6/1964 | Bosmajian | 260/650 |
| 4,304,684 | 12/1981 | Langer | 252/429 B |
| 4,356,111 | 10/1982 | Shipley et al. | 252/429 B |
| 4,400,302 | 8/1983 | Goodall et al. | 252/429 B |
| 4,414,132 | 11/1983 | Goodall et al. | 502/169 |
| 4,439,540 | 3/1984 | Cecchin et al. | 502/123 X |
| 4,464,478 | 8/1984 | Scata et al. | 502/111 |
| 4,472,521 | 9/1984 | Band | 502/121 X |
| 4,496,660 | 1/1985 | Gessell et al. | 502/104 X |
| 4,496,661 | 1/1985 | Shipley | 502/115 |
| 4,526,943 | 7/1985 | Fuentes et al. | 526/133 |
| 4,535,068 | 8/1985 | Job | 502/107 |
| 4,544,717 | 10/1985 | Mayr et al. | 526/125 |
| 4,565,797 | 1/1986 | Etherton et al. | 502/125 X |
| 4,581,342 | 4/1986 | Johnson et al. | 502/119 |

FOREIGN PATENT DOCUMENTS

| | | |
|---|---|---|
| 767586 | 11/1971 | Belgium . |
| 855314 | 12/1977 | Belgium . |
| 856189 | 12/1977 | Belgium . |
| 15762 | 9/1980 | European Pat. Off. . |
| 22675 | 1/1981 | European Pat. Off. . |
| 45533 | 2/1982 | European Pat. Off. . |
| 102503 | 7/1982 | European Pat. Off. . |
| 67417 | 12/1982 | European Pat. Off. . |
| 96770 | 12/1983 | European Pat. Off. . |
| 2914667 | 10/1980 | Fed. Rep. of Germany . |
| 53-136087 | 11/1978 | Japan . |
| 54-133584 | 10/1979 | Japan . |
| 57-25303 | 2/1982 | Japan . |
| 57-200406 | 12/1982 | Japan . |
| 57-200407 | 12/1982 | Japan . |
| 58-103509 | 6/1983 | Japan . |
| 58-104903 | 6/1983 | Japan . |
| 58-109506 | 6/1983 | Japan . |
| 59-11306 | 1/1984 | Japan . |
| 59-184207 | 10/1984 | Japan . |
| 6912467 | 3/1970 | Netherlands . |

Primary Examiner—Patrick P. Garvin

[57] ABSTRACT

A process for polymerizing alpha olefins with a polymerization catalyst containing a solid catalyst component which is prepared by mixing two or more alkyl or aryl magnesium compounds with an aldehyde or a ketone in the presence of a solvent, adding a tetravalent titanium halide to the solution, recovering the resulting precipitate, and contacting the precipitate with a tetravalent titanium halide.

9 Claims, No Drawings

OLEFIN POLYMERIZATION CATALYSTS FROM SOLUBLE MAGNESIUM ALKOXIDES MADE FROM MIXED MAGNESIUM ALKYLS AND ARYLS

This is a continuation-in-part of Application Ser. No. 124,643, filed Nov. 24, 1987 and now abandoned.

BACKGROUND OF THE INVENTION

The present invention relates to olefin polymerization catalyst compositions comprising a magnesium halide and a titanium halide and to a process for the polymerization of olefins using such catalyst compositions.

Numerous proposals are known from the prior art to provide olefin polymerization catalysts obtained by combining a component comprising magnesium halide and a titanium halide with an activating organoaluminum compound. The polymerization activity and the stereospecific performance of such compositions may be improved by incorporating an electron donor (Lewis base) into the component comprising titanium, into the organoaluminum activating component or into both these components. The catalyst compositions of this type which have been disclosed in the prior art are able to produce olefin polymers in an attractive high yield, calculated as g polymer/g titanium, and also with the required high level of stereoregular polymeric material.

The manufacture of magnesium halide supported catalysts for the polymerization of olefins by halogenating a magnesium alkoxide is well known. See U.S. Pat. Nos. 4,400,302 and 4,414,132 to Goodall et al. Since the morphology of the polymer is generally controlled by the morphology of the catalyst, much effort has been expended in attempting to control the morphology of such catalysts. Magnesium alkoxides have been formed by metathesis and/or have been all built to obtain the desired particle size, distribution and bulk density. These methods are costly and time consuming. Thus, there is a need for a simplified method for producing such catalysts but which still allows adequate morphology control.

The present invention provides a simplified means for morphology control for magnesium alkoxide catalyst particles. The magnesium alkoxide is simply formed in solution from a chemical reaction between a mixture of two or more alkyl or aryl magnesium compounds and any aldehyde or ketone. The use of mixed magnesium alkyls or aryls forms a mixture of magnesium alkoxides which is extremely soluble in organic solvents because of entropic effects. Others have prepared soluble magnesium alkoxide catalyst components by forming a complex of the magnesium alkoxide and a compound of another metal, such as aluminum, zinc or boron. U.S. Pat. Nos. 4,496,660; 4,496,661 and 4,526,943 disclose such complexes with other metal compounds. The present invention provides a soluble magnesium alkoxide catalyst component without the necessity of the addition of another metal compound to make it soluble.

SUMMARY OF THE INVENTION

The present invention relates to a solid catalyst component consisting of particles with a narrow particle size distribution which is prepared by mixing two or more alkyl or aryl magnesium compounds with an aldehyde or ketone in the presence of a solvent, adding a tetravalent titanium halide to the solution, recovering the resulting precipitate, and then contacting the precipitate with a tetravalent titanium halide. An electron donor and/or a halohydrocarbon may also be added to the solution along with the tetravalent titanium halide. No inert support material is present in the component.

DETAILED DESCRIPTION OF THE INVENTION

The primary goal of the present invention is to make soluble magnesium alkoxides which can be used in the production of polymerization catalysts with improved morphology. In many cases, the direct reaction of a magnesium alkyl or aryl and an aldehyde or ketone results in a product which is not soluble. Soluble magnesium alkoxides can be obtained by choosing the reactants from specific groups which together create entropic effects which encourage the solubility of the magnesium alkoxide product.

Preferred magnesium compounds are selected from dialkyl and diaryl magnesium compounds and alkyl aryl magnesium compounds. In such compounds the alkyl groups preferably have from 2 to 20 carbon atoms. Examples of these preferred groups of compounds are diethyl magnesium, dibutyl magnesium, di-n.amyl magnesium, dicyclohexyl magnesium, diisopropyl magnesium, isobutylpropyl magnesium, octylisoamyl magnesium, ethylheptyl magnesium, naphthylphenyl magnesium, cumylphenyl magnesium, diphenyl magnesium, ethylphenyl magnesium and isobutylnaphthyl magnesium.

As discussed above, there must be two or more alkyl and aryl magnesium compounds present in the solution in order to obtain the proper entropic effects for good solubility of the alkoxides formed in the solution. Any of the above-described alkyl or aryl magnesium compounds may be mixed together and used to form the solid catalyst component of the present invention. Preferred mixtures include n-butyl-isobutyl magnesium and dialkyl magnesium containing alkyls from $C_2$ to $C_{20}$ (with the peak at $C_4$ to $C_8$).

As stated above, the aldehydes or ketones must be included in the solution in order to form the magnesium alkoxides. Specific examples of aldehydes for use in this invention are paraformaldehyde, acetaldehyde, propionaldehyde, butyraldehyde and valeraldehyde. Specific examples of such ketones include acetone and 2-butanone.

The solvent used for the solution of the mixed magnesium alkyl or aryl compounds and the aldehyde or ketone is generally any nonreactive solvent which will form a homogenous solution of the three and which will also dissolve or at least disperse or suspend the tetravalent titanium halide. The preferred solvents for use herein are isopentane, isooctane, heptane, chlorobenzene and toluene.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e. yielding magnesium halides in which the atomic ratio of halogen to chlorine is at least 1.5. The most preferred reactions are those leading to fully halogenated reaction products, i.e. magnesium dihalides. Such halogenation reactions are suitably effected by employing a molar ratio of magnesium compound to titanium compound of 0.005 to 2.0 preferably 0.01 to 1.0. These halogenation reactions may proceed in the additional presence of an electron donor and/or an inert hydrocarbon diluent or solvent. It is also possible to incorporate an electron donor into the halogenated product.

Suitable halides of tetravalent titaniums are aryloxy- or alkoxydi- and -trihalides, such as dihexanoxytitanium dichloride, diethoxytitanium dibromide, isopropoxytitanium triiodide, phenoxytitanium trichloride, and titanium tetrahalides, preferably titanium tetrachloride.

Suitable halohydrocarbons are compounds such as butyl chloride, phenyl chloride, naphthyl chloride, amyl chloride, but more preferred are hydrocarbons which comprise from about 1 to 12, particularly less than 9, carbon atoms and at least two halogen atoms. Examples of this preferred group of halohydrocarbons are dibromomethane, trichloromethane, 1,2-dichloroethane, di-chloro-fluoroethane, trichloropropane, dichlorodibromodifluorodecane, hexachloroethane and tetrachloroisooctane. Chlorobenzene is the most preferred halohydrocarbon.

The halogenation normally proceeds under formation of a solid reaction product which may be isolated from the reaction medium by filtration, decantation or another suitable method and subsequently washed with an inert hydrocarbon diluent, such as n-hexane, isooctane or toluene, to remove any unreacted material, including physically adsorbed halohydrocarbon. As compared with the catalyst compositions which are prepared by halogenating magnesium compounds with a titanium tetrahalide, the presence of the halohydrocarbon during halogenation of the magnesium compound brings about an increase in the polymerization activity of the resulting catalyst compositions. The halogenated magnesium compounds are precipitated from the solution and recovered before the subsequent treatment with a tetrvalent titanium halide.

Subsequent to halogenation, the product is contacted with a tetravalent titanium compound such as a dialkoxy-titanium dihalide, alkoxy-titanium trihalide, phenoxy-titanium trihalide or titanium tetrahalide. The most preferred titanium compound is titanium tetrachloride. This treatment basically serves to increase the content of tetravalent titanium in the catalyst component. This increase should preferably be sufficient to achieve a final atomic ratio of tetravalent titanium to magnesium in the catalyst component of from 0.005 to 3.0, particularly of from 0.02 to 1.0. To this purpose the contacting with the tetravalent titanium compound is most suitably carried out at a temperature of from 60° to 136° C. during 0.1-6 hours, optionally in the presence of an inert hydrocarbon diluent. Particularly preferred contacting temperatures are from 70° to 120° C. and the most preferred contacting periods are in between 0.5 to 2.5 hours.

After the treatment with tetravalent titanium compound the catalyst component may be isolated from the reaction medium and washed to remove unreacted titanium compound. The preferred halogen atom contained in the titanium compound which serves as halogenating agent in the tetravalent titanium compound with which the halogenated product is contacted is chlorine.

The organoaluminum compound to be the employed as cocatalyst may be chosen from any of the known activators in olefin polymerization catalyst systems comprising a titanium halide. Hence, aluminum trialkyl compounds, dialkyl aluminum halides and dialkyl aluminum alkoxides may be successfully used. Aluminum trialkyl compounds are preferred, particularly those wherein each of the alkyl groups has 2 to 6 carbon atoms, e.g. aluminum triethyl, aluminum tri-n-propyl, aluminum tri-isobutyl, aluminum triisopropyl and aluminum dibutyl-n-amyl.

One or more electron donors may be included in the catalyst either independently or along with the organoaluminum compound. This electron donor is commonly known as a selectivity control agent. Suitable electron donors, which are used in combination with or reacted with an organoaluminum compound as selectivity control agents and which are also used in the preparation of the solid catalyst component are ethers, esters, ketones, phenols, amines, amides, imines, nitriles, phosphines, silanes, phosphites, stilbines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and organic silicon compounds. Preferred esters are esters of aromatic carboxylic acids, such as ethyl and methyl benzoate, p-methoxy ethyl benzoate, p-ethoxy methyl benzoate, p-ethoxy ethyl benzoate. Other esters are ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amine hexyl benzoate, isopropyl naphthenate, n-amyl toluate, ethyl cyclohexanoate, propyl pivalate. Examples of the organic silicon compounds useful herein include alkoxysilanes and acyloxysilanes of the general formula $R^1{}_n Si(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane, phenyltrimethoxy silane and the like. The donor used as selectivity control agent in the catalyst may be the same as or different from the donor used for preparing the titanium containing constituent. Preferred electron donors for use in preparing the titanium constituent are ethyl benzoate and isobutyl phthalate. Preferred as selectivity control agent in the total catalyst in p-ethoxy ethyl benzoate, phenethyltrimethoxy silane and diphenyldimethoxy silane.

Preferred amounts of electron donor contained in the cocatalyst, calculated as mol per mol aluminum compounds, are chosen from the range of from 0.1 to 1.0, particularly from 0.2 to 0.5. Preferred amounts of electron donor optionally contained in the solid component, calculated as mol per mol of magnesium are those within the range of from 0.05 to 10, particularly from 0.1 to 5.0. The solid catalyst components described herein are novel compositions per se and they are also included within this invention. To prepare the final polymerization catalyst composition, components are simply combined, most suitably employing a molar ratio to produce in the final catalyst an atomic ratio of aluminum to titanium of from 1 to 80, preferably less than 50.

The present invention is also concerned with a process for polymerizing an olefin such as ethylene or butylene, preferably propylene, employing the novel catalyst compositions. These polymerizations may be carried out by any one of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the novel catalyst compositions or one of the catalyst components to the polymerization reactor. The activity and stereospecificity of the novel catalyst compositions are so pronounced that there is no need for any catalyst removal or polymer extraction techniques. Total metal residues in the polymer, i.e. the combined aluminum, chlorine and titanium content, can be as low as 200 ppm, even less than 100 ppm, as will be shown in the examples.

EXAMPLE 1

Fifty millimols of paraformaldehyde and 60 milliliters of chlorobenzene were stirred overnight with 25 millimols of a mixed alkyl magnesium solution (available from Ethyl Corporation containing alkyls from $C_4$ to $C_{20}$ with the peak in the $C_4$ to $C_8$ range). Then 1.8 milliliters of ethylbenzoate was added to the non-viscous solution and 75 milliliters of an 80/20 mixture of titanium tetrachloride and chlorobenzene was also added. The temperature was raised to 80° C. and the solution was stirred for 30 minutes. The precipitated product was filtered and then washed twice with a 50/50 mixture of titanium tetrachloride and chlorobenzene at 80° C. and then was filtered hot and rinsed with six 150 ml portions of isopentane at room temperature. Finally, the product was dried under flowing nitrogen at 40° C. The catalyst contained 4.08% titanium and 17.43% magnesium. The catalyst particles came out in a narrow particle size range which carried on to the polymer.

EXAMPLE 2

The catalyst prepared above was used to polymerize propylene in a liquid pool polymerization (LIPP) process which was carried out for 1 hour at 67° C., in a 1 gallon autoclave, using 2.7 liters of propylene, 132 millimoles of hydrogen and sufficient catalyst to provide 8 micromoles of titanium. Triethyl aluminum (70 mols per mole of titanium) was mixed with 17.5 millimoles of the selectivity control agent, ethylbenzoate, and premixed with the procatalyst made in Example 1 for 5 to 30 minutes before injection or injected directly into the autoclave before procatalyst injection. The productivity of the catalyst from Example 1 was 160 kg of propylene per gram of titanium and the xylene solubles were 8%.

EXAMPLE 3

The procedure of Example 1 was repeated using butyraldehyde instead of paraformaldehyde. The catalyst contained 2.04% titanium and 17.36% magnesium. The catalyst particles came out in a narrow particle size range which carried on to the polymer.

EXAMPLE 4

The catalyst prepared in Example 3 was used to polymerize propylene in accordance with the procedure of Example 2. The productivity of the catalyst of Example 3 was 500 kg of polypropylene per gram of titanium at a xylene solubles of 3.7%.

What is claimed:

1. A process for preparing a catalyst component which is useful in the polymerization of alpha olefins, contains no inert support material and has a narrow particle size distribution, which comprises:
    (1) mixing two or more alkyl or aryl magnesium compounds with an aldehyde or ketone in the presence of a solvent;
    (2) adding a tetravalent titanium halide to the solution;
    (3) recovering the resulting precipitate; and
    (4) contacting the precipitate with a tetravalent titanium halide.

2. The process of claim 1 wherein the magnesium compounds are selected from the group consisting of diethyl magnesium, dibutyl magnesium, di-n.amyl magnesium, dicyclohexyl magnesium, di-isopropyl magnesium, isobutylpropyl magnesium, octylisoamyl magnesium, ethylheptyl magnesium, naphthylphenyl magnesium, cumylphenyl magnesium, diphenyl magnesium, ethylphenyl magnesium and isobutylnaphthyl magnesium and a mixture of n-butyl-isobutyl magnesium and dialkyl magnesium containing alkyls from $C_2$ to $C_{20}$ (with peak at $C_4$ to $C_8$).

3. The process of claim 1 wherein an aldehyde is present and it is selected from the group consisting of paraformaldehyde, acetaldehyde, propionaldehyde, butyraldehyde and valeraldehyde.

4. The process of claim 1 wherein a ketone is present and it is selected from the group consisting of acetone and 2-butanone.

5. The process of claim 1 wherein the tetravalent titanium halide is titanium tetrachloride.

6. The process of claim 1 wherein an electron donor is added to the solution in step (2).

7. The process of claim 6 wherein the electron donor is ethyl benzoate.

8. The process of claim 1 wherein a halohydrocarbon is added to the solution of step (2).

9. The process of claim 8 wherein the halohydrocarbon is chlorobenzene.

* * * * *